United States Patent
Joseph

(10) Patent No.: US 7,159,436 B2
(45) Date of Patent: Jan. 9, 2007

(54) ASYMMETRICAL PUNCH

(75) Inventor: J. Michael Joseph, Newport News, VA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 434 days.

(21) Appl. No.: 10/833,348

(22) Filed: Apr. 28, 2004

(65) Prior Publication Data

US 2005/0241446 A1  Nov. 3, 2005

(51) Int. Cl.
*B21D 28/26* (2006.01)
*F02M 59/00* (2006.01)

(52) U.S. Cl. .............. 72/335; 72/334; 29/890.142; 29/896.6; 29/557; 219/149; 239/533.2

(58) Field of Classification Search .......... 72/334, 72/335; 29/890.142, 896.6, 896.62, 557, 29/558; 219/149; 239/533.2
See application file for complete search history.

(56) References Cited

U.S. PATENT DOCUMENTS

| | | | |
|---|---|---|---|
| 335,334 A | 2/1886 | Brady | |
| 488,135 A * | 12/1892 | Smith | 72/335 |
| 600,687 A | 3/1898 | Flemming | |
| 1,528,587 A * | 3/1925 | Thackray | 72/335 |
| 2,737,831 A | 3/1956 | Webb | |
| 2,846,902 A | 8/1958 | Cowley | |
| 4,072,039 A | 2/1978 | Nakanishi | |
| 4,923,169 A | 5/1990 | Grieb et al. | |
| 4,970,926 A | 11/1990 | Ghajar et al. | |
| 5,002,231 A | 3/1991 | Reiter et al. | |
| 5,201,806 A | 4/1993 | Wood | |
| 5,335,864 A | 8/1994 | Romann et al. | |
| 5,344,081 A | 9/1994 | Wakeman | |
| 5,365,819 A | 11/1994 | Maida et al. | |
| 5,489,065 A | 2/1996 | Nally, Jr. | |
| 5,553,397 A | 9/1996 | Schwitzky et al. | |
| 5,636,796 A | 6/1997 | Oguma | |
| 5,697,154 A | 12/1997 | Ogihara | |
| 5,730,368 A * | 3/1998 | Flik et al. | 239/575 |
| 5,746,376 A | 5/1998 | Romann et al. | |
| 5,816,093 A | 10/1998 | Takeuchi et al. | |
| 5,931,391 A | 8/1999 | Tani et al. | |
| 6,009,787 A | 1/2000 | Hänggi | |
| 6,039,271 A | 3/2000 | Reiter | |
| 6,070,812 A | 6/2000 | Tani et al. | |
| 6,089,476 A | 7/2000 | Sugimoto et al. | |
| 6,131,826 A | 10/2000 | Teiwes | |
| 6,176,266 B1 * | 1/2001 | Huber et al. | 72/335 |
| 6,230,537 B1 * | 5/2001 | Easterbrook | 72/334 |
| 6,789,406 B1 * | 9/2004 | Spencer | 72/335 |

(Continued)

FOREIGN PATENT DOCUMENTS

JP  59-223121  12/1984

(Continued)

*Primary Examiner*—David B. Jones

(57) ABSTRACT

An asymmetrical tool is provided to form an asymmetric orifice for an orifice disc. The asymmetric orifice is initially formed with a wall portion extending generally perpendicular to first and second generally parallel surfaces of the orifice disc. The wall of the orifice is deformed by the tool into an inlet portion contiguous to the first surface and a transition portion spaced from the first surface. The transition portion of the wall extends substantially perpendicular to the first and second generally planar surfaces. The inlet portion of the wall extends at a first oblique angle with respect to the first surface, and the first oblique angle varying with respect to the longitudinal axis. A method of forming the orifice with the tool is described.

9 Claims, 4 Drawing Sheets

U.S. PATENT DOCUMENTS 6,948,665 B1 * 9/2005 Joseph .................... 239/533.2

FOREIGN PATENT DOCUMENTS

| JP | 60-137529 | 7/1985 |
| JP | 52-32192 | 3/1997 |
| WO | WO 2005/005818 A | 1/2005 |
| WO | WO 2005/010348 A | 2/2005 |

* cited by examiner

ASYMMETRICAL PUNCH

FIELD OF INVENTION

This invention relates generally to electrically operated fuel injectors of the type that inject volatile liquid fuel into an automotive vehicle internal combustion engine, and in particular the invention relates to a novel thin disc orifice member for such a fuel injector.

BACKGROUND OF THE INVENTION

It is believed that contemporary fuel injectors can be designed to accommodate a particular engine in part to meet tailpipe emission standards. The ability to meet stringent tailpipe emission standards for mass-produced automotive vehicles is at least in part attributable to the ability to assure consistency in both shaping and aiming the injection spray or stream, e.g., toward intake valve(s) or into a combustion cylinder. Wall wetting should be avoided.

Because of the large number of different engine models that use multi-point fuel injectors, a large number of unique injectors are needed to provide the desired shaping and aiming of the injection spray or stream for each cylinder of an engine. To accommodate these demands, fuel injectors have heretofore been designed to produce straight streams, bent streams, split streams, and split bent streams. In fuel injectors utilizing thin disc orifice members, such injection patterns can be created solely by the specific design of the thin disc orifice member. This capability offers the opportunity for meaningful efficiency in manufacturing since other components of the fuel injector are not necessarily required to have a unique design for a particular application, i.e. many other components can be of a common design.

It is believed that known orifices can be formed in the following manner. A flat metering disc is formed with an orifice that extends generally perpendicular to the flat metering orifice disc, i.e., a "straight" orifice. In order to achieve a bending or split angle, i.e., an angle at which the orifice is oriented relative to a longitudinal axis of the fuel injector, the orifice can be formed by punching at an oblique angle relative to the longitudinal axis to provide an "angled orifice," i.e., an orifice angled with respect to the planar surface of the metering disc or a longitudinal axis extending perpendicularly between the flat surfaces of the disc.

However, the punching of oblique or angled orifices in a metering disc has been observed to provide a less than desirable performance. In particular, the working end of the tool, which is oriented oblique to the workpiece, tends to break during the punching process. Even if the punch tool does not break during the angled orifice punching process, the punch tool may skip, slide, or deflect upon impact with the surface of the work piece and therefore could cause the work piece to be damaged and discarded. Further, the skipping sliding, or deflecting of the punch could cause the work piece to move around laterally or vertically. To avoid the movements of the work piece, a complex work piece retention arrangement is utilized to ensure that the work piece is stationary relative to a support surface.

Thus, it would be desirable to provide for a tool without the perceived disadvantages of the known punch tool.

SUMMARY OF THE INVENTION

The present invention provides for a tool. The preferred embodiment of the present invention includes an asymmetric punch tool for forming an orifice extending through a workpiece. The tool comprises an elongated body extending along a tool axis between a first tool end and a second tool end about a tool axis to define a tool perimeter. The first tool end is configured to receive a tool punching force. The second tool end includes a cone having an apex and a base. The apex and the base are connected by a plurality of straight lines therebetween to define a conic surface. The apex is located generally coincident to the tool axis and the base is disposed on a plane generally oblique to the tool axis so that a periphery of the base defines an elliptical profile.

The present invention also provides for a method of forming an orifice disc for a fuel injector with a tool. The orifice disc includes a member having first and second generally parallel surfaces. The method comprises extending a first tool having a generally cylindrical outer surface through the first and second generally parallel surfaces of the member so that an orifice having an interior surface defining a cylindrical wall generally orthogonal to the first and second surfaces is formed therebetween; and extending a second tool through the orifice with a tool end including a cone having an apex and a base, the apex and the base connected by a plurality of straight lines therebetween to define a conic surface, the apex located generally coincident to the tool axis and the base located on a plane generally oblique to the tool axis so that the wall of the orifice is deformed into a transition portion spaced from the first surface, the transition portion of the wall extending substantially perpendicular to the first and second generally planar surfaces, and an inlet portion coupling the transition portion to the first surface, the inlet portion of the wall extending at a first oblique angle with respect to the first surface, and the first oblique angle varying with respect to the longitudinal axis.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT(S)

Figure 1:
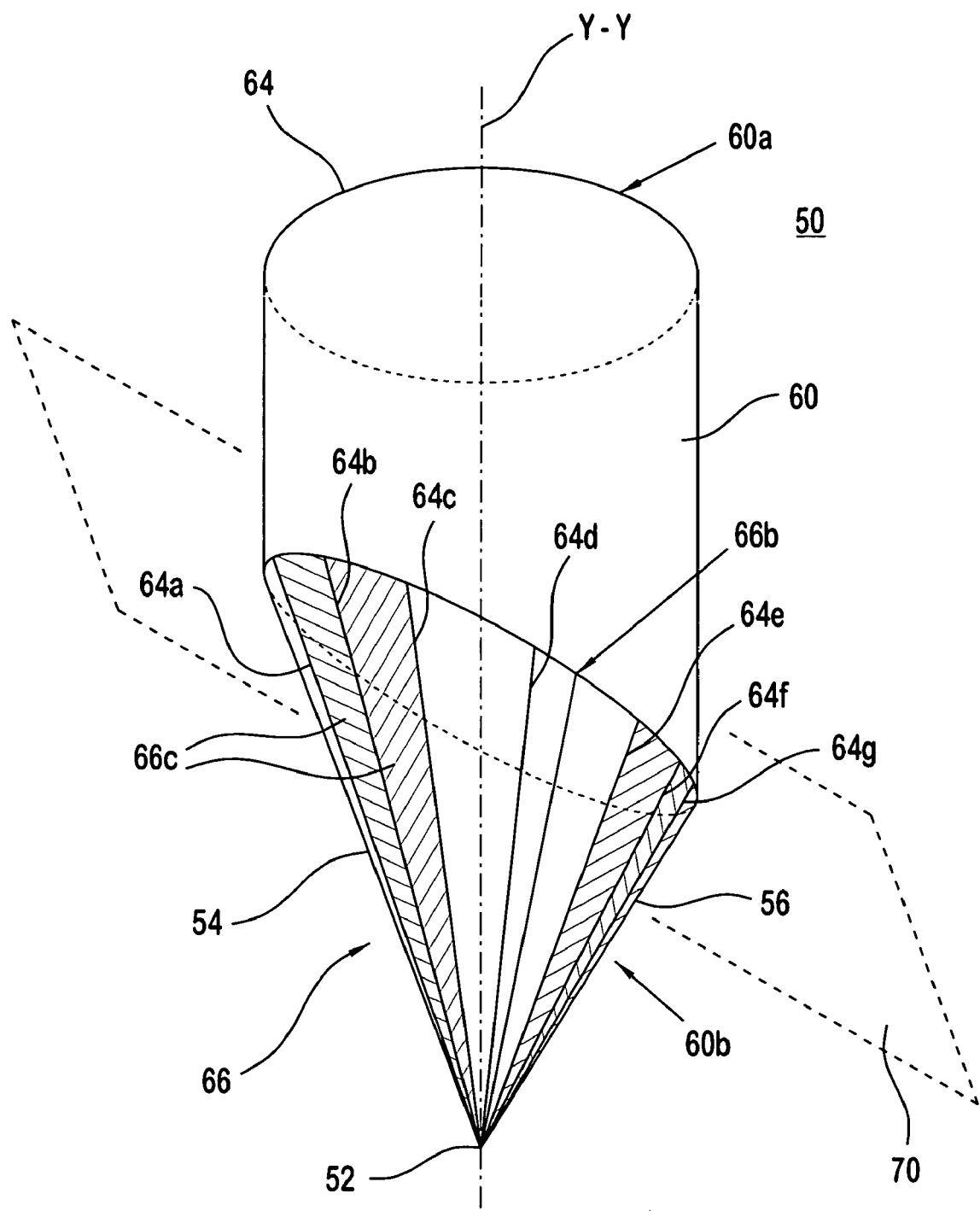
FIG. 1 illustrates an isometric view of the punch tool of the preferred embodiment.
Figure 1A:
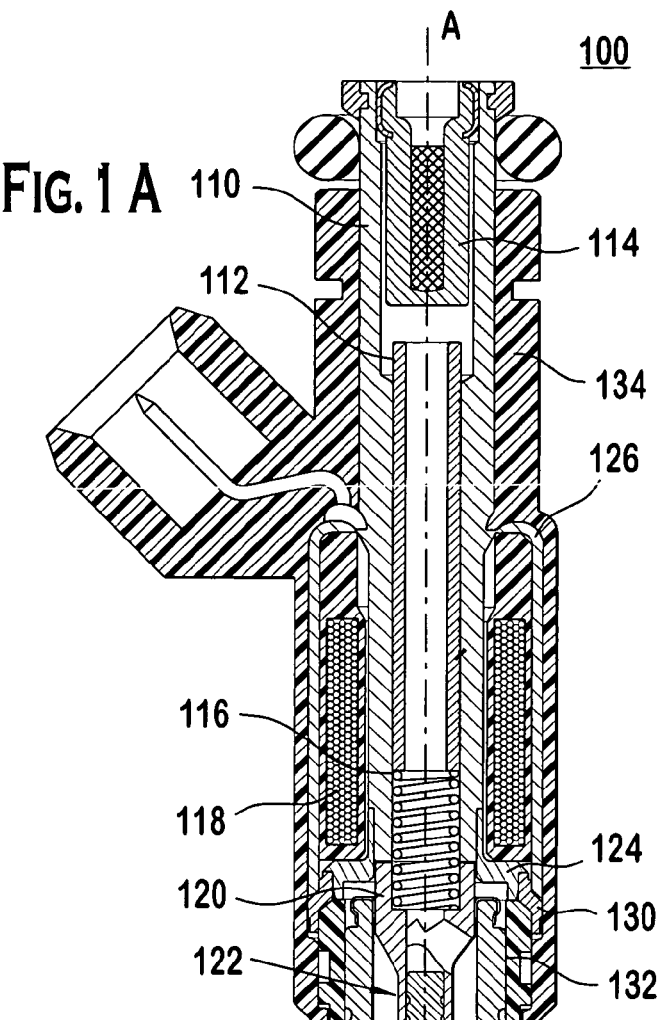
FIG. 1A is a cross-sectional view of a fuel injector according to a preferred embodiment.
Figure 1B:
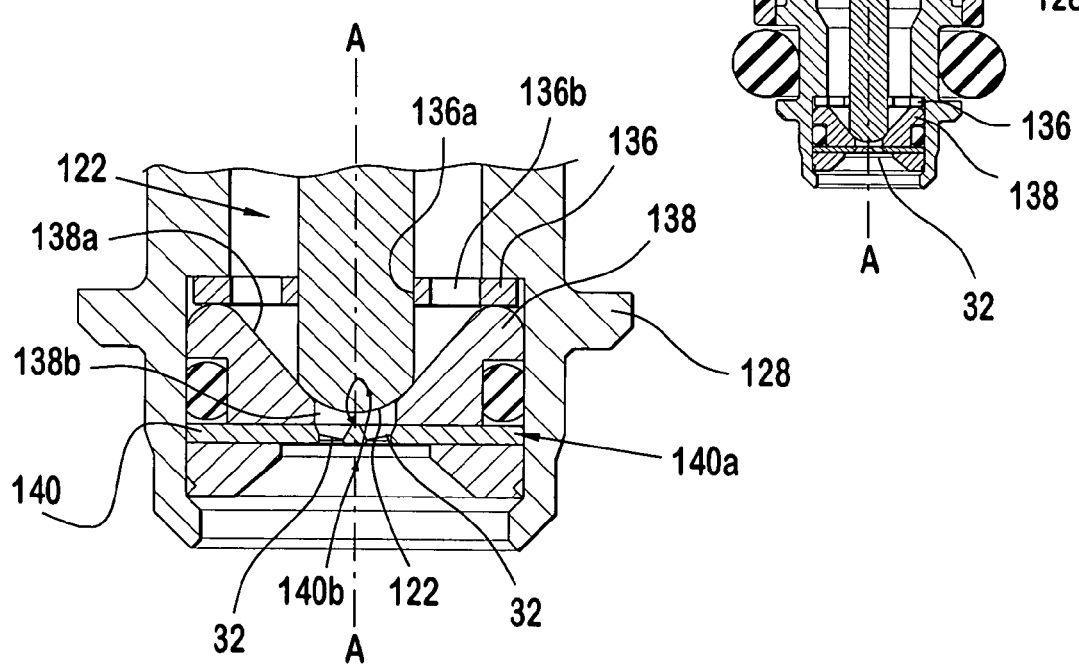
FIG. 1B is a cross-sectional view of the outlet end portion of the fuel injector of FIG. 1A.
Figure 2A:
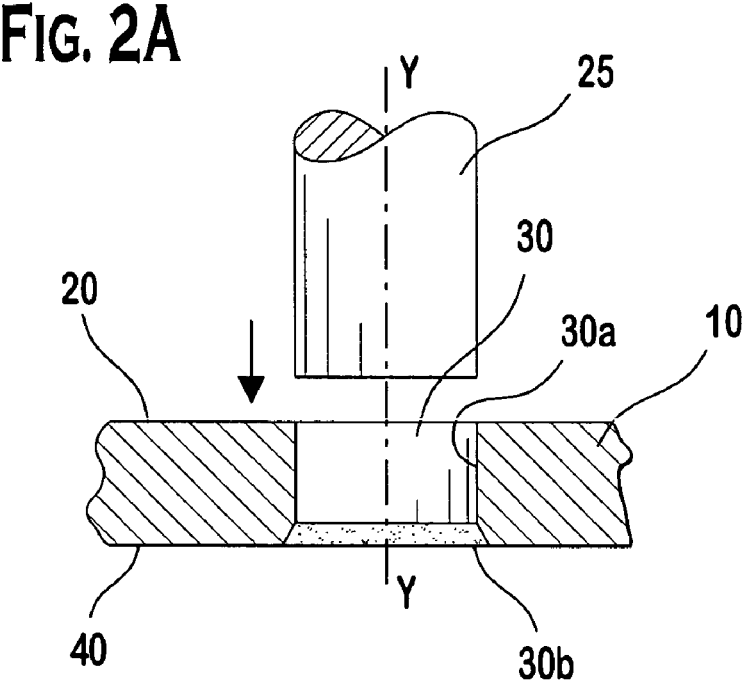
FIGS. 2A and 2B depict parts of the process of forming the orifice disc of the preferred embodiments.
Figure 2B:
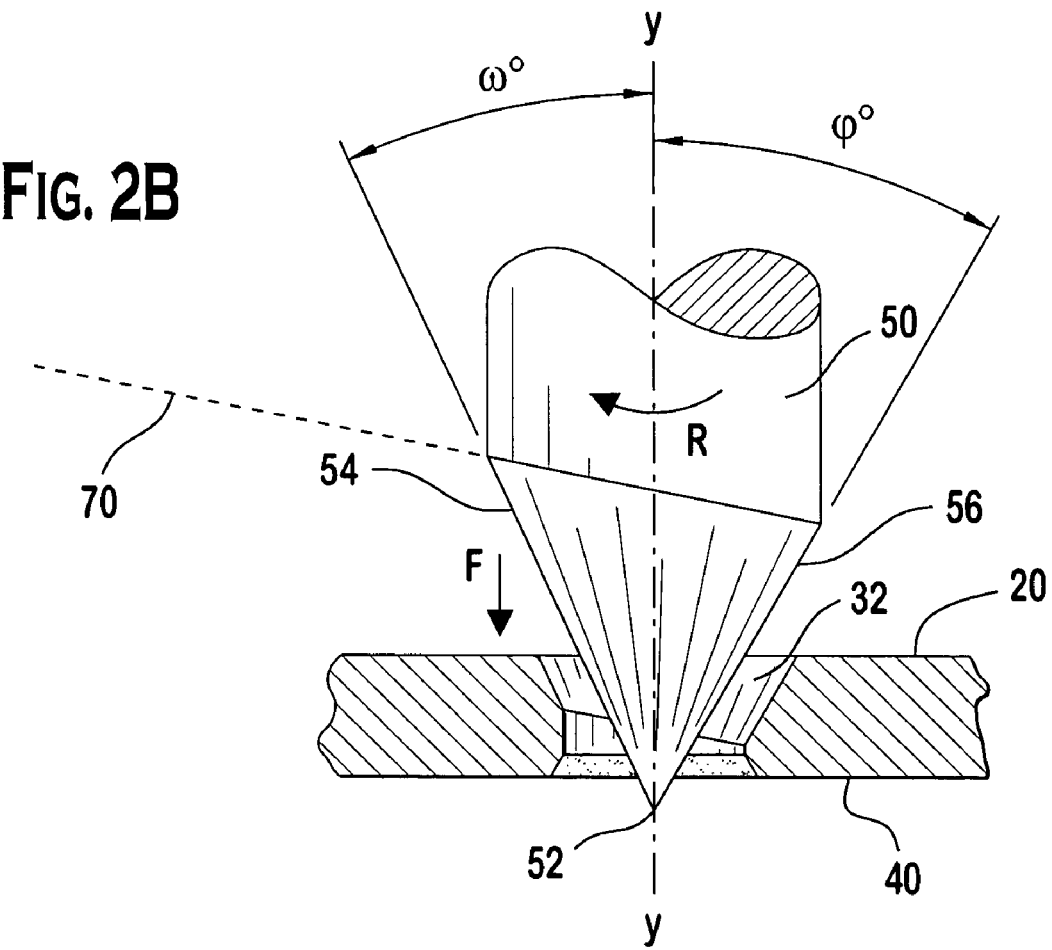
Figure 2C:
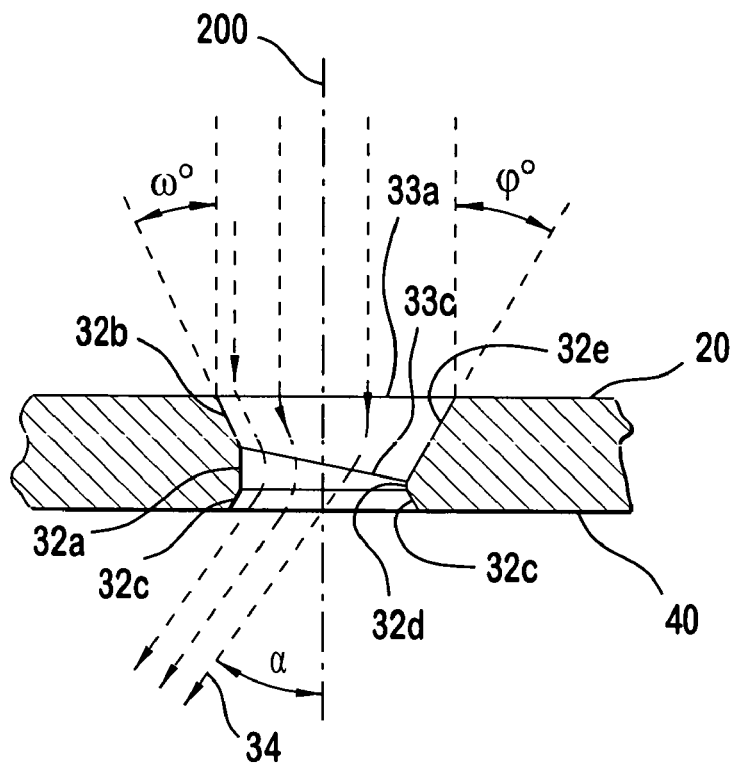
FIG. 2C depicts details of the orifice disc of FIG. 2B in a fragmentary cross-sectional view.
Figure 2D:
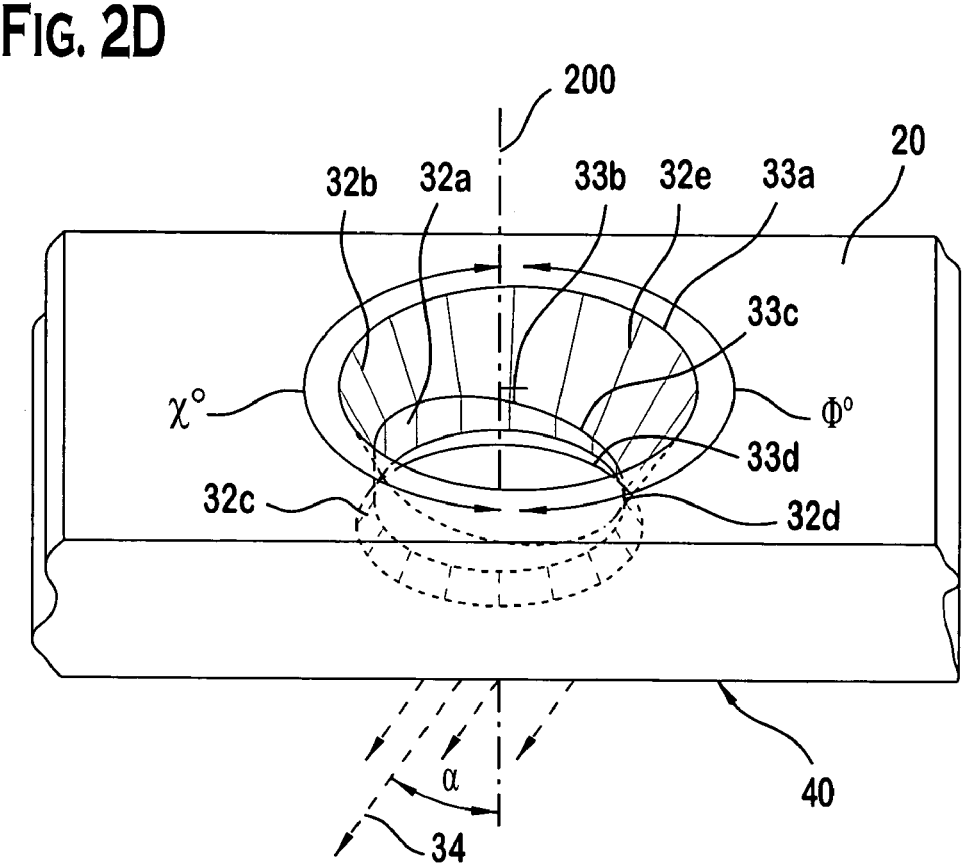
FIG. 2D depicts details of the orifice disc of FIG. 2B in a fragmentary perspective view.

FIGS. 1, 1A–1B, and 2A–D illustrate the preferred embodiments. FIG. 1 illustrates a tool 50 that can be used in conjunction with a cylindrical punch to form an asymmetric metering orifice 32 in an orifice disc that emulates an angled orifice, i.e., one that has a wall oblique to a longitudinal axis of the orifice disc without requiring a tool to be oriented oblique to the longitudinal axis. In particular, the asymmetric orifice 32 is formed by a punch tool 50 having an apex 52 with at least two leading edges disposed about the tool axis Y—Y such that the resulting cross-section of the punch tool 50 is asymmetric about the orifice axis 200 (FIGS. 2C, 2D).

As shown in FIG. 1, the tool 50 includes an elongated body 60 extending along a tool axis Y—Y between a first tool end 60a and a second tool end 60b about the tool axis Y—Y to define a tool perimeter 64. The first tool end 60a is configured to receive a tool punching force F. The second tool end 60b includes a cone 66 having an apex 66a and a base 66b. The apex 66a and the base 66b are connected by a plurality of straight lines 64a, 64b, 64c . . . and so on contiguous to the apex 66a and base 66b to define a conic surface 66c. The apex 66a is located generally coincident to the tool axis Y—Y and the base 66b is located on a plane 70 generally oblique to the tool axis Y—Y so that when the apex 66a is extended through a pilot orifice, the asymmetric orifice is formed in the disc for a fuel injector. In order to explain the preferred embodiment of the tool and its advantages, a detailed description of a fuel injector in relation to the tool 50 is described as follows.

The fuel injector 100 has a metering orifice disc 140 disposed proximate an outlet end of the fuel injector 100, which extends along a longitudinal axis A—A, as illustrated in FIG. 1A. The fuel injector 100 includes a fuel inlet tube 110, an adjustment tube 112, a filter assembly 114, a coil assembly 118, a coil spring 116, an armature 120, a closure member assembly 122, a non-magnetic shell 124, a fuel injector overmold 134, a body 128, a body shell 130, a body shell overmold 132, a coil assembly housing 126, a guide member 136 for the closure member assembly 122, a seat 138, and a orifice disc 140. The construction of fuel injector 100 can be of a type similar to those disclosed in commonly assigned U.S. Pat. Nos. 4,854,024; 5,174,505; and 6,520,421, which are incorporated by reference herein in their entireties.

FIG. 1B shows the outlet end of a body 128 of a solenoid operated fuel injector 100 having an orifice disc 140. The outlet end of fuel injector 100 is also similar those of the aforementioned patents including that of a stack. The stack includes a guide member 136 and a seat 138, which are disposed axially interiorly of orifice disc 140. The stack can be retained by a suitable technique such as, for example, a retaining lip with a retainer or by welding the disc 140 to the seat 138 and welding the seat 138 to the body 128.

Seat 138 can include a frustoconical seating surface 138a that leads from guide member 136 to a central passage 138b of the seat 138 that, in turn, leads to a central portion 140b of orifice disc 140. Guide member 136 includes a central guide opening 136a for guiding the axial reciprocation of a sealing end of a closure member assembly 122 and several through-openings 136b distributed around opening 136a to provide for fuel to flow through sealing end to the space around seat 138. FIG. 1B shows the hemispherical sealing end of closure member assembly 122 seated on seat 138, thus preventing fuel flow through the fuel injector. When closure member assembly 122 is separated from the seat 138, fuel is permitted to pass thorough passage 138b, through orifices 32 extending through the orifice disc 140 such that fuel flows out of the fuel injector 100.

The orifice disc 140 can have a generally circular shape with a circular outer peripheral portion 140a that circumferentially bounds the central portion 140b that is located axially in the fuel injector. The central portion 140b of orifice disc 140 is imperforate except for the presence of one or more asymmetric orifices 32 via which fuel passes through orifice disc 140. Any number of asymmetric orifices 32 can be configured in a suitable array about the longitudinal axis A—A so that the orifice disc 140 can be used for its intended purpose in metering, atomizing, and targeting fuel spray of a fuel injector. The preferred embodiments include four such through-asymmetric orifices 32 (although only two are shown in the Figures) arranged about the longitudinal axis A—A through the orifice disc 140.

Referencing FIGS. 2A and 2B, the preferred embodiments of the orifice disc 140 can be formed as follows. Initially, a generally planar blank workpiece 10 having a first surface 20 spaced at a distance from a second surface 40 without any orifices extending therethrough is provided. The first and second surfaces 20 and 40 can be spaced apart anywhere from 50 to 600 microns. The blank 10 can be penetrated by a suitable technique such as, for example, punching, coining, drilling or laser machining to form a pilot through opening or pilot orifice 30. The pilot orifice can be symmetrical about and extend along an axis Y—Y of a suitable tool generally perpendicular to the planar surfaces 20 and 40 of the blank workpiece 10. Preferably, the symmetrical pilot through-opening 30 is formed by a cylindrical punch 25 that forms a perpendicular burnished wall section 30a between surface 20 and proximate surface 40 with a rough chamfer 30b formed by a breakout (i.e., a fracturing) of material by the cylindrical punch 25 as the cylindrical punch 25 penetrates through to the second surface 40.

The symmetrical through opening or orifice 30 can be further penetrated by a suitable tool to form an asymmetrical through-opening or orifice 32. Preferably, the tool forming the asymmetric orifice 32 is the punch tool 50 shown in FIG. 1.

As shown in FIG. 2B, the conic surface 66c has first leading edge 54 and second leading edge 56. The first leading edge 54 is oriented at a first lead angle $\omega°$ with respect to axis Y—Y different from the second lead angle $\phi$ of the second leading edge 56. In one of the preferred embodiments, the first lead angle $\omega°$ is approximately 25 degrees and the second lead angle $\phi°$ is approximately 30 degrees. Referring to FIG. 1, disposed between the first leading edge 54 and second leading edge 56 are a plurality of surface profiles contiguous to one another between the edges 54 and 56 at respective lead angles relative to the tool axis Y—Y. The lead angles for the conic surface about the tool axis Y—Y can be a range of angles in discrete steps between the first and second lead angles. Preferably, the lead angles for the conic surface about the tool axis Y—Y include continuously varying angles between the first and second lead angles. The tool 50 has an outer diameter with respect to the longitudinal axis from about 0.5 millimeters to about 10 millimeters, and can be made of a suitable material, such as, for example, tool steel, carbide, or other alloys. Preferably, the tool has an outer diameter of about 1.5 millimeters and is formed of carbide steel.

Referring again to FIG. 2B, a force F can be applied along the axis Y—Y on the punch tool 50 to form the orifice 32. Alternatively, a rotary torque R can also be applied along with the punching force F. Where the rotary torque R is not utilized, the orifice 32 preferably has a configuration as shown in the perspective view of FIG. 2D. The orifice 32 in this preferred configuration allows for the flow of fuel through the orifice to be oblique with respect to the orifice axis.

Referring to FIG. 2C, the orifice 32 is shown after the punching of the tool 50 through the workpiece along the orifice axis 200. The orifice 32 has a wall coupling the first and second surfaces 20, 40 that includes a first wall portion 32a, second wall portion 32b, and third wall portion 32c. The first wall portion 32a is spaced from the first surface 20 and extends substantially perpendicular to the first and second generally planar surfaces 20, 40 and about the orifice axis 200 to define a transition perimeter 42 surrounding the passageway of the orifice 32. The second wall portion 32b couples the first wall portion 32a to the first surface 20 to define an inlet perimeter 44 on the first surface.

The inlet perimeter 33a has a convergent surface that includes surfaces 32b and 32e converging towards and about the orifice axis 200 (FIG. 2C). The converging surfaces 32b and 32e intersect the first wall portions 32a and 32d to define the transition perimeter 42, which has the shape of an ellipse at the intersection between the convergent surfaces 32b and 32e and the first wall portions 32a and 32d. As shown in FIGS. 2C and 2D, the ellipse lies on an oblique plane with respect to the orifice axis 200. Referring to FIG. 2C, the third portion 32c of the wall extends at a second oblique angle with respect to the second surface 40, which angle is generally constant about the orifice axis 200. The junctures of the first and second entry chamfers 32b and 32e with respect to the surface 20 can form the first perimeter 33a having a geometric center 33b offset relative to the longitudinal axis 200 (FIGS. 2D and 2C). Preferably, the perimeter 33a is a generally elliptical perimeter.

The first entry chamfer 32b leads to a first wall surface 32a (FIG. 2C). The first wall surface 32a is disposed at about the first angular extension $\chi°$ about the longitudinal axis and merges into a second wall surface 32d disposed over the second angular extension $\Phi°$ (FIG. 2D) such that the first and second wall surfaces 32a and 32d are asymmetric to axis 200. Preferably, the first wall surface 32a and the second wall surface 32d are parallel to the tool axis Y—Y, which in this case is coincident with an orifice axis 200 such that both surfaces form a cylindrical wall surface about the axis 200. The junctures between first and second chamfers 32b, 32e with first and second wall surfaces 32a, 32d form a second perimeter 33c (FIG. 2D) disposed on a plane generally oblique to the first and second surfaces 20, 40.

The first wall surface 32a can merge into a first exit chamfer 32c. Similarly, the second wall surface 32d can merge into a second exit chamfer 32c. The exit chamfer 32c with respect to the surface 40 can form a third perimeter 33d having a geometric center coincident to or offset with respect to the axis 200.

As described above, the punch tool 50 are believed to provide many advantages because an angled metering orifice can be formed by tools moving in a direction perpendicular to the workpiece to generate an orifice that emulates an angled orifice, yet without requiring the tools to be oriented oblique to the perpendicular direction relative to the surface of the workpiece. Furthermore, geometry of the orifice generated by the preferred punch tool 50 tends to prevent the fuel flow 34 from attaching to the walls of the orifice 32, which feature is believed to permit more of the fuel to be atomized. Moreover, the convergent surfaces 32b and 32e formed by the punch tool 50 tends to induce a portion of fuel flowing through the orifice 32 to travel about and along the longitudinal axis. Consequently, the tool 50 allows for the emulation of an angled orifice without the difficulty associated in the formation of an angled orifice, such as, for example, tool breakage or tool deflection of a tool oriented oblique to the surface of the workpiece.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. An asymmetric punch tool for forming an orifice extending through a workpiece, the tool comprising:

an elongated body extending along a tool axis between a first tool end and a second tool end about a tool axis to define a tool perimeter, the first tool end configured to receive a tool punching force, the second tool end including:
a cone having an apex and a base, the apex and the base connected by a plurality of straight lines therebetween to define a generally conic surface, the apex generally coincident to the tool axis and the base being disposed on a plane generally oblique to the tool axis so that a periphery of the base defines an elliptical profile.

2. The tool according to claim 1, wherein the conic surface comprises a first surface having a first surface profile extending from the apex to the base at a first lead angle and a second surface having a second surface profile extending from the apex to the base at a second lead angle different from the first lead angle.

3. The tool according to claim 2, wherein the first lead angle is approximately 25 degrees and the second lead angle is approximately 30 degrees.

4. The tool according to claim 3, wherein the first and second surfaces comprise a plurality of surfaces contiguous to one another to define a plurality of surface profiles extending from the apex to the base at respective continuously varying lead angles between 25 and 30 degrees.

5. The tool according to claim 4, wherein the tool perimeter comprises a perimeter located at a diameter of about 4 millimeters.

6. The tool according to claim 5, wherein the tool comprises a carbide steel material.

7. A method of forming a orifice disc for a fuel injector, the orifice disc including a member having first and second generally parallel surfaces, the method comprising:
extending a first tool having a generally cylindrical outer surface through the first and second generally parallel surfaces of the member so that an orifice having an interior surface defining a cylindrical wall generally orthogonal to the first and second surfaces is formed therebetween; and
extending a second tool through the orifice with a tool end including a cone having an apex and a base, the apex and the base connected by a plurality of straight lines therebetween to define a conic surface, the apex located generally coincident to the tool axis and the base located on a plane generally oblique to the tool axis so that the wall of the orifice is deformed into a transition portion spaced from the first surface, the transition portion of the wall extending substantially perpendicular to the first and second generally planar surfaces, and an inlet portion coupling the transition portion to the first surface, the inlet portion of the wall extending at a first oblique angle with respect to the first surface, and the first oblique angle varying with respect to the longitudinal axis.

8. The method according to claim 7, wherein the deforming of the orifice comprises at least one of punching, drilling, shaving, and coining.

9. The method according to claim 8, wherein the deforming the orifice comprises at least one of punch forming and coining.

* * * * *